Aug. 30, 1966     H. O. WALKER, JR., ETAL     3,270,316
ACOUSTIC ATTENUATION LOGGING SYSTEM
Filed Feb. 7, 1963

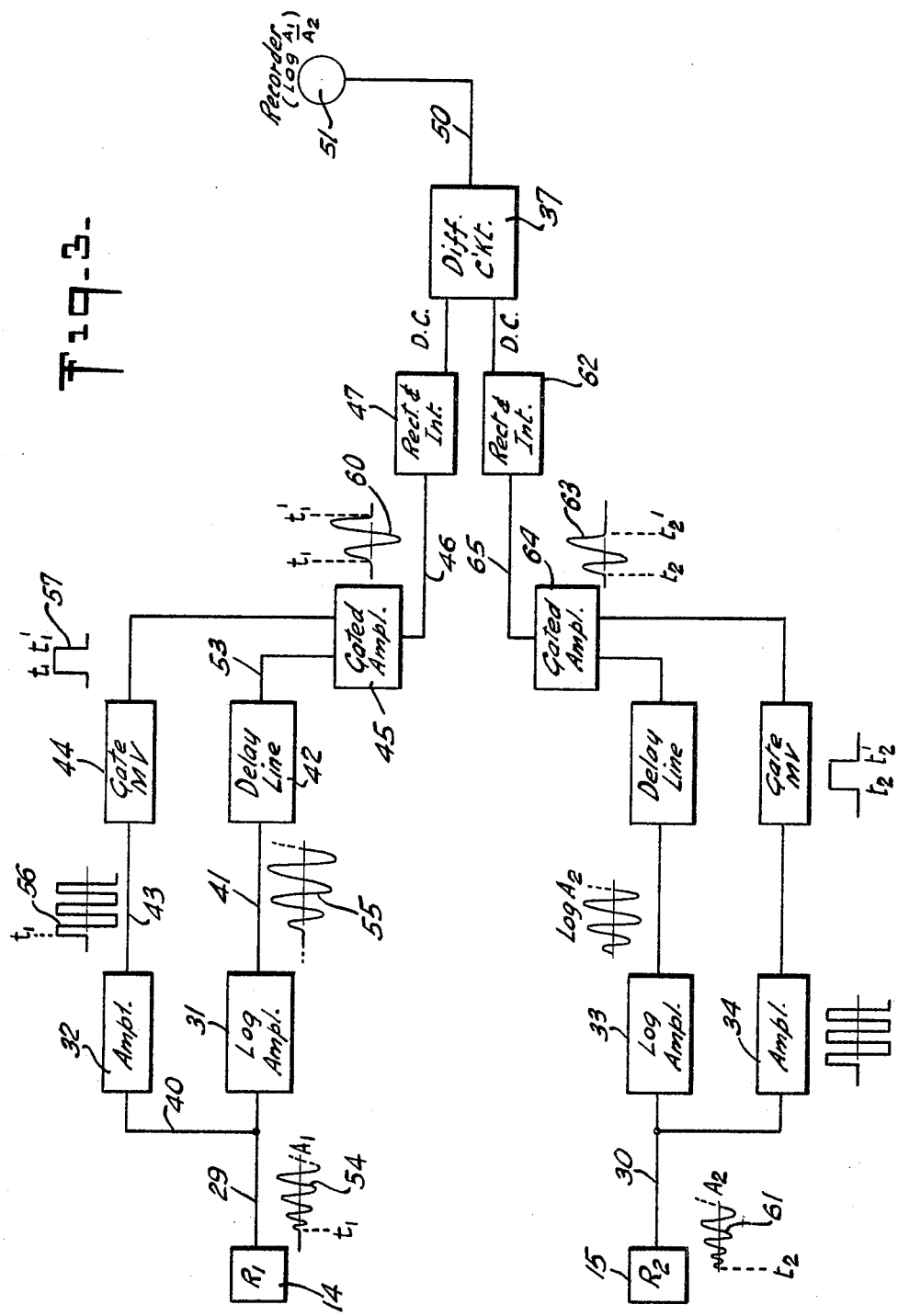

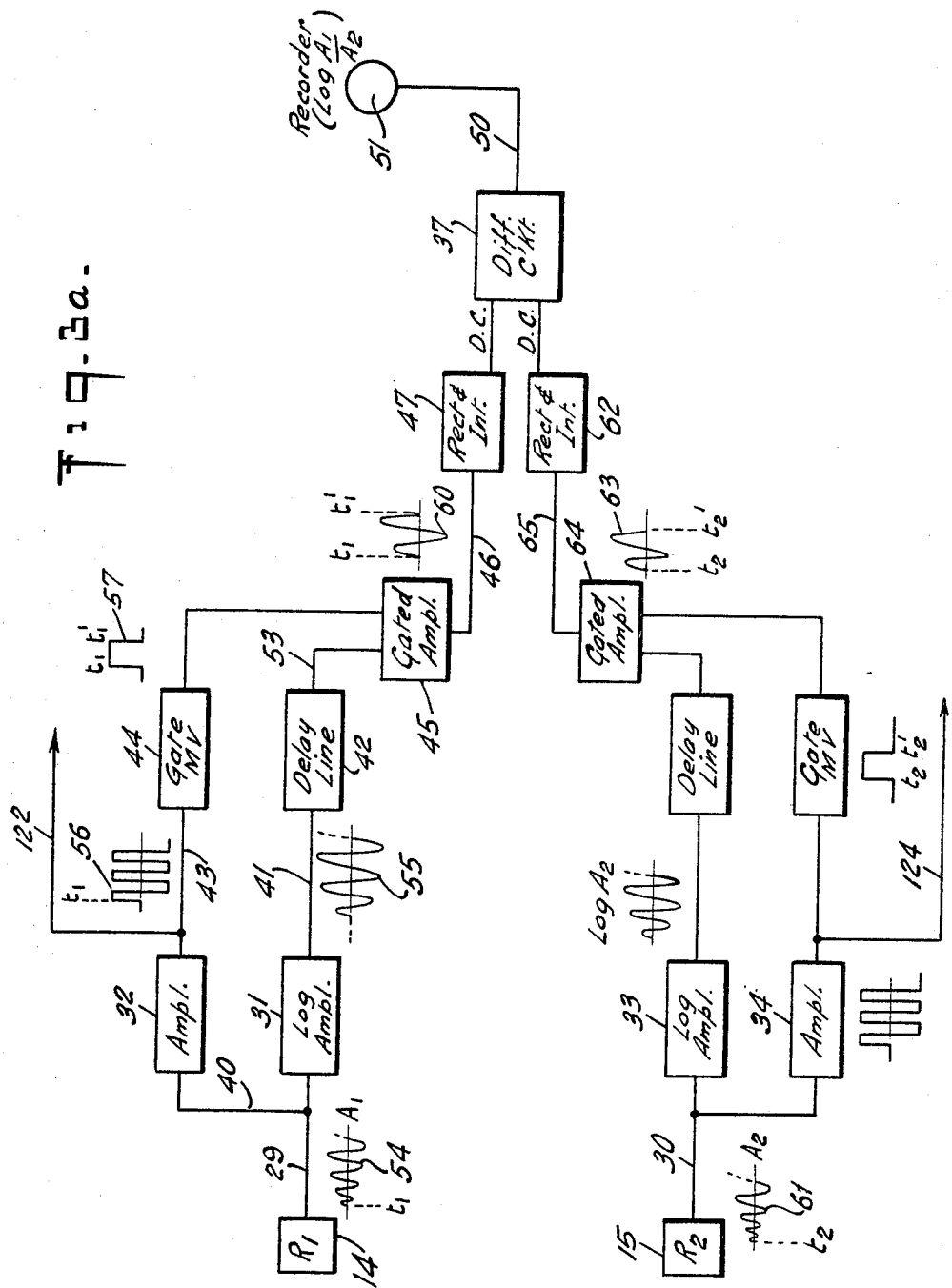

Aug. 30, 1966  H. O. WALKER, JR., ETAL  3,270,316
ACOUSTIC ATTENUATION LOGGING SYSTEM
Filed Feb. 7, 1963  4 Sheets-Sheet 4

United States Patent Office 3,270,316
Patented August 30, 1966

3,270,316
ACOUSTIC ATTENUATION LOGGING SYSTEM
Hugh O. Walker, Jr., and Kerry D. Savage, Houston, Tex., assignors to Texaco Inc., New York, N.Y., a corporation of Delaware
Filed Feb. 7, 1963, Ser. No. 256,898
13 Claims. (Cl. 340—18)

This is a continuation-in-part of application Ser. No. 136,515, filed September 7, 1961, now abandoned.

This invention concerns deep hole acoustic velocity logging in general, and more specifically deals with the attenuation aspects of such logging.

Heretofore many attempts have been made to provide a workable system in connection with the so-called attenuation type, acoustic velocity logging. Such attempts have been made by reason of the recognition that important additional information may be gained if the attenuation of velocity signals may be accurately determined and related to the formation through which such acoustic signals pass.

In accordance with such prior attempts, there has been among other suggestions one for comparing the amplitudes of two acoustic velocity signals that have both traversed a common formation where such comparison is made following the recording of the amplitudes of the velocity signals. Clearly, such an arrangement is subject to difficulties in the accurate comparison of the amplitudes involved, especially since many extraneous factors may have been included in the signals as recorded.

Another of the prior suggestions, concerned an arrangement for comparing an acoustic signal that had traveled through the formation adjacent to a borehole, with another signal that was received at the same location as the first signal but that had traveled over a direct path within the borehole. The latter signal having been reflected from the borehole wall. Such an arrangement does not in fact compare signals that have both traversed the formation, and consequently the comparison provided is not a true indication of the actual formation attenuation that is separate and distinct from the velocity of the acoustic signal.

Thus, it is an object of this invention to provide a system which is able to compare, within the equipment itself, two signals that have traveled a common path through the formation surrounding a borehole, so as to determine a comparison of the amplitudes of these signals in an improved manner.

Another object of this invention is to provide an acoustic attenuation logging system, such that it includes the ability to give an output signal that may be directly calibrated in terms of decibels of attenuation.

Another object of this invention is to provide a system which gives the benefits of employing logarithmic amplification of acoustic signals, so as to easily accommodate a wide dynamic range of signal amplitudes. In addition, the system according to this invention provides for the ability to make a straightforward comparison of signals, by taking a difference between two D.C. signals. This difference represents the log of the ratio of the signals being compared. In this manner the output may be directly calibrated in terms of decibels, since by definition the term decibel involves a quantity that is logarithmic in nature.

In addition to the foregoing objects and benefits of this invention, there are included the advantages to be gained where two acoustic receivers are employed in acoustic velocity logging generally. This provides the advantage of cancelling out of variations which are common to the signal path of both receivers.

Briefly, the invention may be described as one that is applicable for use in an acoustic logging system to be employed in a borehole. The system according to the invention comprises means for developing a first electrical signal in response to acoustic energy in the borehole, wherein said electrical signal has a series of alternations. It also comprises means for developing a second electrical signal in response to acoustic energy at a location in the borehole spaced longitudinally from said first electrical signal means, and wherein said second electrical signal has a series of alternations. The invention also comprises means for logarithmically amplifying each of said first and second electrical signals, and comprises gating means for passing only a predetermined first part of each of said first and second electrical signals. Furthermore the invention comprises means for rectifying and integrating each of said predetermined first parts of said first and second electrical signals, plus means for taking a difference between said rectified and integrated signals to provide an output representing the ratio of said predetermined first part signals in a form which may be calibrated in terms of decibels of attenuation between the locations of said first and second named means.

The foregoing and other objects and benefits of this invention are described below in greater detail in connection with a specific embodiment thereof, and are illustrated in the drawings, in which:

FIGURE 3 is a schematic circuit diagram in block form showing the entire system according to a preferred embodiment of the invention;

FIG. 3a is a schematic circuit diagram in block form of the system of the invention wherein the connections to the velocity logging system are indicated.

Figure 1:
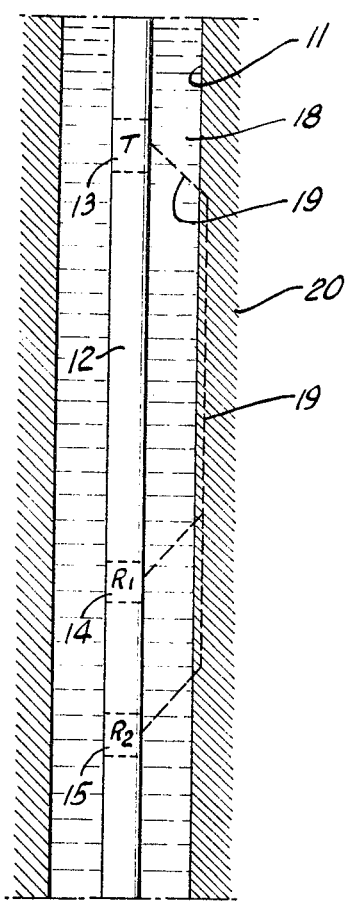
FIGURE 1 is a schematic showing of a portion of a borehole in cross section, with a logging tool therein for carrying out a logging operation according to this invention.
Figure 2:
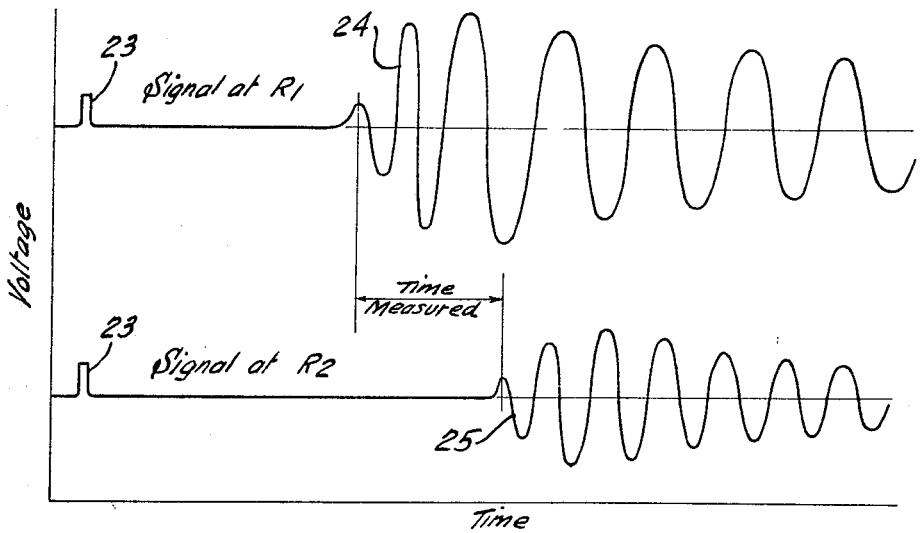
FIGURE 2 is a graph showing voltage as the ordinate and time as the abscissa, and showing the electrical signals generated at each of the two receives spaced vertically apart within the borehole.
Figure 4:
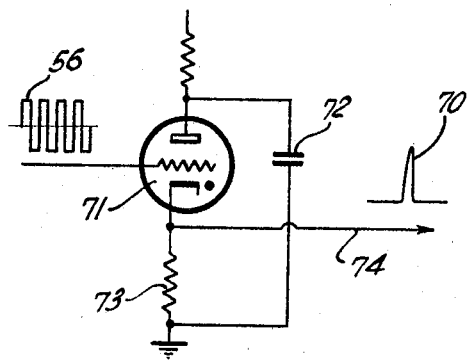
FIGURE 4 is a circuit diagram illustrating a typical trigger circuit to be used in connection with the FIGURE 3 system.

Referring first to FIGURES 1 and 2, it is pointed out that in acoustic velocity logging (as in the attenuation type of logging according to this invention) there is employed in a borehole, e.g., borehole 11 illustrated in FIGURE 1, a logging tool 12 that includes a transmitting transducer 13 and two longitudinally spaced apart receiving transducers 14 and 15. It is pointed out that both the receiving transducers 14 and 15 are located spaced a predetermined distance longitudinally away from the transmitting transducer 13. The transmitting transducer 13 periodically generates high intensity acoustic energy pulses which are received by the receiving transducers, all in a manner well known in the art of acoustic well logging.

As the logging operation is carried out and for each cycle of the operation, there is a pulse of acoustic energy created by the transmitter 13 and transmitted through fluid 18 in the borehole 11. This pulse traverses a path such as indicated by a dashed line 19 as it travels toward the receiving transducers 14 and 15. It will be understood that the path 19 is a schematic ray path indication which illustrates how the acoustic energy under consideration travels from the transmitter 13 and enters the formation surrounding the borehole walls, e.g. a formation 20 illustrated, and then travels through the formation over a refracted path to once more enter and be transmitted by the fluid 18 in the borehole back to the receivers 14 and 15 as indicated.

A cycle of the foregoing operation is indicated by the FIGURE 2 graph. There is shown on each of the two curves spaced vertically from one another, a simultaneous transmitter pulse 23 that represents a low voltage high current electrical pulse that creates a sharp acoustic pulse generated at the transmitter 13. Then after a short time delay while the acoustic pulse travels over the above indicated paths, it reaches the receivers 14 and 15 in turn. At each receiver the acoustic pulse, which will have become lengthened out in traversing the indicated paths, will be transformed into electrical voltage signals in each case in accordance with the captions shown on FIGURE 2. Thus, the receivers 14 and 15 ($R_1$ and $R_2$) will receive acoustic energy and generate electrical alternating signals 24 and 25 respectively. It will be clear that these voltage signals are the result of the arrival of acoustic energy in the form of a pressure wave having a few cycles duration and arriving at a time dependent upon the velocity of the formation 20 plus the time required to cross the borehole fluid 18 at each end of the travel through the formation. By measuring the time difference between the arrival of signal 24 at receiver 14 and that of signal 25 at receiver 15, a velocity determination may be made for the acoustic velocity of formation 20.

Now in accordance with this invention, by taking the signals of receivers $R_1$ and $R_2$ and making a comparison in the manner more fully described below, a measurement of the attenuation characteristic of formation 20 may be had in addition to the velocity characteristic just described. In this regard it is to be noted that there will always be some difference in amplitude, under ordinary circumstances, between the signals 24 and 25 by reason of the longer path of travel for the acoustic energy in reaching receiver 15 (signal 25) over that of the energy in reaching receiver 14 (signal 24). Thus, as illustrated in the idealized curves shown in FIGURE 2, signal 25 has a reduced amplitude in comparison with signal 24.

In order to have the attenuation characteristics as measured by this invention, most meaningful, it is important to compare only the first portion of each of the acoustic signals received at the receivers 14 and 15. This is because if too much of these signals are allowed to go into any comparison arrangement, there may be extraneous and non-direct traveling energy arrivals included in the signals. It will be observed, however, that by using appropriate circuit means only the first few cycles of each acoustic signal may be compared, to provide a ratio of the amplitudes thereof. Such ratio will give information which may be related to important attributes of the formation, such as the presence or absence of a gas therein. In other words, where a gas may exist in a given formation, even in very small percentages, the attenuation of an acoustic signal will be appreciably more than in the absence of such gas. At the same time, the velocity of travel of the acoustic energy remains substantially unchanged.

Referring to FIGURE 3 and then to the specific elements thereof illustrated in FIGURES 4–7, it will be explained how the applicants' invention provides an improved system whereby the attenuation of acoustic signals may be indicated by means of an output signal in D.C. form which is such that it may be calibrated directly in decibels of attenuation.

An illustrative system for carrying out the invention is shown in FIGURE 3. At the left end of the diaphragm there are the two receivers 14 and 15 which may take any feasible form, such as a crystal type of acoustic transducer, that creates an electrical output signal in direct accordance with the acoustic pressure waves which impinge upon such transducer. In each case the signals respectively from receiver 14 and 15 are transmitted over a circuit indicated by a wire 29 and a wire 30 for receivers 14 and 15 respectively. Then each signal is carried to the inputs of both a logarithmic amplifier 31 and a high gain amplifier 32, in the case of the wire 29 from receiver 14; while there is a logarithmic amplifier 33 and a high gain amplifier 34 both connected with parallel inputs to receive the output of receiver 15. Each signal then continues through the system in a similar manner which will be described more fully in connection with the $R_1$ (receiver 14) path which carries the signals from receiver 14 via circuit connection 29. It will be understood that the signal path from receiver 15 is substantially identical, at least until it reaches the common point where a difference circuit 37 has two inputs, one for each of the two signals from the indicated paths.

Returning to the signal that is created at receiver 14 ($R_1$), its progress through the system may be traced as follows. It is transmitted over wire 29 and a wire 40 to the inputs of the logarithmic amplifier 31 and the high gain amplifier 32, in parallel. The output of the logarithmic amplifiers 31 travels over a circuit connection 41 to a delay line 42, while the output signal from amplifier 32 travels over a circuit connection 43 to a multivibrator 44 that acts to control a gate 45 which may also be an amplifier at the same time. The output from gate 45 travels over a circuit connection 46 to a rectifier and integrator 47 that transforms the signal to D.C. form in order to facilitate the comparison thereof with the signal traveling from the other path connected to receiver 15. Such comparison is carried out in the difference circuit 37 which provides a D.C. output over a circuit connection 50 that leads to a recorder, or the like, 51 as illustrated.

It is to be observed that by employing a system according to this invention, one of the meritorious results may be attributed to the fact that by employing logarithmic amplification of each of the two signals representing the acoustic energy, and by thereafter taking the difference between such logarithmically amplified signals the result is in terms of the logarithm of the ratio of the two signals. This may be shown by simple mathematics which teaches that the log of the ratio of two numbers is equal to the difference of the individual logs of the numbers. Consequently since the output signal is proportional to the logarithm of the ratio of the signals, this output may be directly calibrated in terms of decibels. The latter is because the basis for expressing the amount of acoustic energy in decibels, involves the logarithm of the acoustic signal amplitude, i.e. it involves the logarithm of the electrical signal generated by the acoustic signal at the receiving transducer. This provides a real benefit in that the resulting signal does not need any special treatment to come out with a signal that is in a most meaningful and prefered form. It may be noted here that the logarithmic amplifier 31 (or 34) need not amplify the signal so long as the output signal is proportional to the logarithm of the acoustic generated signal. Thus, a device that merely logarithmically attenuated the input signals thereof would be sufficient if adequate amplitudes were available.

In the FIGURE 3 illustration, signal wave forms are illustrated to represent graphically the signals that pass through the system. This has been done to facilitate an understanding of the operation of the system. Thus, taking the signal channel from receiver 14 there is an alternating electrical signal 54 which commences at a time $t_1$ and continues for some several cycles, only the first few of which are illustrated. After passing through the logarithmic amplifier 31 this signal has been amplified logarithmically while retaining its form, as shown by a signal 55 in the illustration.

At the same time the signal 54 is amplified in amplifier 32 where it is changed in form by reason of the characteristics of this amplifier, to become a steep front square wave 56, which begins at the same instant $t_1$ as shown by the illustration.

As indicated above, it is desired to eliminate a predeterminad later portion of the total acoustic generated signal 54. This is done after the logarithmic amplification which produced the signal 55 and following a short delay by the delay line 42 to insure that the beginning of the signal will be included. Thus the signal 55 (after delay) is applied via a circuit connection 53 to the gated amplifier 45. The gate acts in a well known manner to pass signals therethrough only during the time when the gate is open.

Control of the gate 45 is carried out by a square wave pulse signal 57 created at the multivibrator 44. Multivibrator 44, in turn, is triggered indirectly by the signal 56 that was provided at the output of the amplifier 32. In this manner the multivibrator signal 57 has its leading edge created at the time $t_1$ which is the beginning of the acoustic generated signal 54. By employing the proper design with respect to the multivibrator 44, the duration of the pulse 57 will be in accordance with a desired predetermined time as particularly indicated above, e.g. the illustrated time from $t_1$ to $t_1'$ which has been chosen to include only the first complete cycle and a half of the acoustic generated signal being measured.

The resulting output wave form 60 from gate 45 is the portion of the logarithmically amplified signal 55 which has been slightly delayed in delay line 42 so as to insure that the beginning of this wave is included in the time during which the gate 45 is open. After thus cutting off all but the predetermined first portion of the acoustic generated and logarithmically amplified signal, it is rectified and integrated in the rectifier and integrator 47 so as to provide a D.C. signal that is proportional to the logarithm of such predetermined first portion of the acoustic generated and logarithmically amplified signal under consideration.

It will be clear that the same thing as just described above takes place with respect to the second transducer 15 and the acoustic generated signals that are produced thereby and that travel over the other signal channel, i.e. that is connected to the transducer 15. Thus it will be understood that there is another signal 61 which is created at the output of the other receiver 15. This second signal is quite similar to the signal from receiver 14 except for the amplitude thereof because it is created by the acoustic signal energy arriving at the second transducer 15 which is located spaced longitudinally farther away from the source (transmitter 13). The only other difference is that it (signal 61) occurs later in time as was indicated above in regard to the FIGURE 2 description. Consequently there results a signal 63 that occurs during the corresponding time (from $t_2$ to $t_2'$) during which another gated amplifier 64 is open. Furthermore this signal 63, which is the counterpart of signal 60 described above, is introduced to a counterpart rectifier and integrator 62 via a circuit connection 65. Then this second signal 63 is transformed into a D.C. signal proportional to the logarithm of a predetermined first portion of the second acoustic generated signal under consideration.

Therefore, by feeding the outputs of rectifier and integrator 47 and rectifier and integrator 62 into the difference circuit 37, a difference output may be had over the circuit connection 50 which represents the difference between the signals which signals are proportional to the indicated logarithms. Consequently as already indicated above, this final difference signal is proportional to the logarithm of the ratio of the two signals under consideration. Some of the advantages of this arrangement have been already mentioned above.

FIGURES 4–7 illustrate in greater detail typical circuits that are for carrying out the indicated operations described in connection with FIGURE 3 above. Thus, in FIGURE 4 there is illustrated a trigger circuit that was not described per se, but that is for use in connection with actuating the multivibrator. This is needed to avoid triggering the multivibrator more than once each cycle. This trigger takes the form of a gas filled triode tube 71 that has (in the case of the upper channel described in FIGURE 3) the steep front square wave signal 56 applied to the grid or input circuit thereof. The output of this gas triode is taken from the cathode circuit, as illustrated, and a trigger pulse 70 is created. The form of pulse 70 is due to the operation of the gas tube 71 which has a capacitor 72 connected from the plate of the triode to the ground connection side of a cathode resistor 73. The output signal is carried over a circuit wire 74 as indicated, that is connected to the cathode side of the resistor 73. The trigger pulse 70 thus created is applied to the multivibrator 44 which is a standard element that may take any feasible form and is not shown in circuit detail. The output of the multivibrator which is triggered by the pulse 70 as transmitted on output circuit wire 74, is in the form of a rectangular square wave pulse 57 that is created in coincidence with the trigger pulse and that then exists for a predetermined length of time depending upon the circuit constant characteristics of the multivibrator. Therefore the leading edge of the square wave pulse 57 commences at the time $t_1$ (or $t_2$) as indicated while the trailing edge is located a predetermined time later that is determined by the characteristics of the multivibrator. It will be noted that this is a so-called "one-shot" type of multivibrator.

Figure 5:
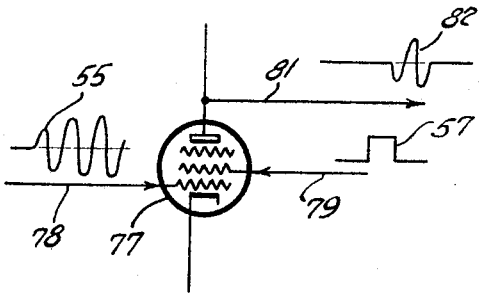
FIGURE 5 is a circuit diagram illustrating a typical gate circuit which may be used in the FIGURE 3 system.

In FIGURE 5, there is illustrated a typical gate circuit, that may also be an amplifier at the same time. This takes the form of a pentode vacuum tube 77 which has two grids that each may act in control of the conductive path through the tube. Consequently one of these grids may be connected to receive the signal to be passed by the gate and amplified, while the other may have a gating control signal that determines whether or not the tube 77 will be conducting and pass any signals. As applied to the FIGURE 3 system, the signal 55 will be introduced on a circuit wire 78; while on the other control grid which is connected to a wire 79, there will be applied the square wave gating pulse 57 from the multivibrator 44. Furthermore, as indicated the characteristics of the tube 77 and related circuit constants are such that it will conduct and pass a signal only when the grid 79 is sufficiently positive, i.e. has the square wave pulse 57 from the multivibrator 44 applied thereto. All the rest of the time the tube is cut off or non-conducting and no matter what signal is being applied to the other control grid over circuit 78, no output from the gate will be had. The output circuit for this gate tube 77 is carried from the plate over a circuit connection 81 and the output signal that will pass under the conditions described above is illustrated by a wave shape symbol having reference numeral 82. It will be appreciated that this wave 82 is the same as wave 60 (or its counterpart wave 63) in FIGURE 3 but shown inverted since this is actually what happens to a signal passing through a single stage amplifier of the type shown.

Figure 6:
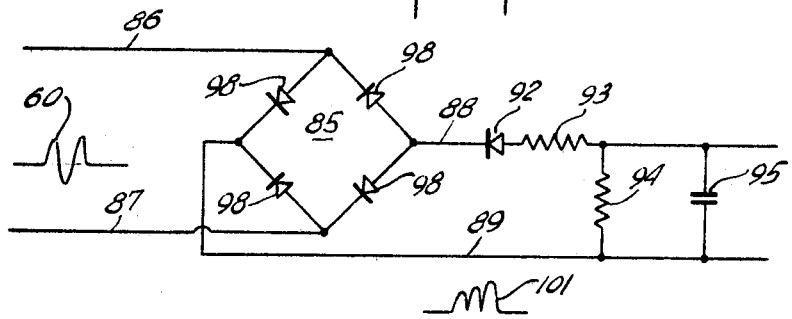
FIGURE 6 is a circuit diagram illustrating a preferred type of rectifier and integrator circuit for use in the FIGURE 3 system.

FIGURE 6 illustrates a preferred type of rectifier and integrator that may be used in the block 47 (or block 62) of the FIGURE 3 system. There is a bridge type full wave rectifier 85 that has a pair of input connections 86 and 87. These inputs connect to diagonal points on the bridge 85, while the output of the bridge is carried via circuit connections 88 and 89. Connected to the output of the bridge 85, there is an integration circuit which may include a diode 92 plus a series resistor 93 and a resistor 94 connected across the output terminals as well as a capacitor 95. The action of this type of full wave rectifier is well known and need not be explained in detail. It will be sufficient to note that the bridge 85 is made up of four diodes 98 that are connected with their polarities as indicated, so that the full wave rectifying action will take place and an input signal such as the signal 60 (or its counterpart 63) will be rectified to produce the same wave forms except that negative swings are turned over to become positive since the rectifier is connected to pass positive swings only. This produces at the output of the bridge 85 a wave form 101. It will be appreciated that at the output side of the integrator, i.e. resistors 93, 94 and capacitor 95, there will be a substantially smooth D.C. voltage produced that is the average value for the signal 101 that was produced at the output of the bridge 85.

Figure 7:
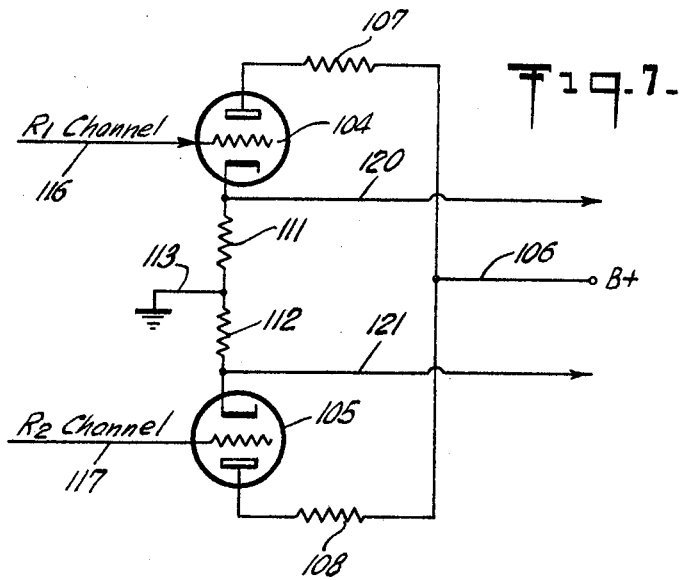
FIGURE 7 is a circuit diagram illustrating a preferred type of difference circuit to be used in the FIGURE 3 system.

Referring to FIGURE 7, there is shown in greater detail a preferred type of difference circuit for use in the FIGURE 3 system at the block 37 thereof. Thus the difference circuit of FIGURE 7 would have each of the rectified and integrated signals from rectifier and integrators 47 and 62 applied to the two inputs thereof. This difference circuit includes two triode tubes 104 and 105 that are connected as shown with a common plate supply introduced over a circuit connection 106 that divides and goes to each of the plates of tubes 104 and 105 via plate resistors 107 and 108 respectively. The cathodes of tubes 104 and 105 are connected together via two cathode resistors 111 and 112 that have the mid-point thereof connected to ground by a circuit connection 113 shown. The inputs for the difference circuit are introduced via circuit connections 116 and 117 for the tubes 104 and 105 respectively. These input connections go to the grid of each tube. The single output for the difference circuit is shown as two wires 120 and 121 that are connected from the cathode side of the cathode resistors 111 and 112 to provide both sides of a complete circuit. The output signal is in the nature of a potential difference, or a D.C. voltage existing between the cathode potentials of tubes 104 and 105. By reason of having a common plate supply connection for the tubes 104 and 105, any variations in this voltage will affect the output in equal and opposite manner with respect to the two sides of the output circuit so that the output will not be affected thereby. Therefore the output signal will remain a true indication of the input difference of potentials.

It will be understood that the input signal being applied to each of the circuit connections 116 and 117 will be from each of the rectifier and integrators 47 and 62 respectively in the FIGURE 3 system showing. The circuit connections will be made so that the D.C. output signals from the integrators are connected with the proper polarities between the respective input circuit connection and ground to complete the required circuit in each case.

It will be clear that the operation of the difference circuit is such that whenever the potentials applied to grids of tubes 104 and 105 are different, the difference will show up on the output connections as a difference in potential there. On the other hand if there is no difference between the potentials on the input circuits then the potentials of the cathode side of each of resistors 111 and 112 will be identical and the difference in potential on circuit output connections 120 and 121 will be zero, since they are then both the same. It will be appreciated that the output thus exists in the form of a D.C. signal, which as explained above represents or is proportional to the logarithm of the ratio of a predetermined short portion of the two input signals.

It is pointed out that a logging system according to this invention may be constructed with various elements of the system located down hole and at the surface, depending upon the particular embodiment employed. This depends upon various aspects, e.g. the method to be employed for sending the information up from the elements that are down hole. This in turn depends upon whether multi-conductor cable is to be used in connecting the elements down hole with the surface, and similar considerations.

Furthermore, it may be observed that if the receiving transducers 14 and 15 are separated sufficiently to insure an adequate time separation between the acoustic generated signals, the separate circuits could be combined and time shared without changing the principles of the invention.

Referring to FIGURE 3a, it is pointed out that an attenuation logging system according to this invention may be employed with a velocity logging system. For example, by taking off signals from the amplifiers 32 and 34 via circuit connections 122 and 124 respectively, the velocity signals may be transmitted up hole and recorded in accordance with the arrangement shown and described in U.S. Patent No. 3,071,203. It will be appreciated that this will accomplish simultaneous velocity and attenuation logging.

Where the foregoing joint velocity and attenuation logging is carried out, it may be preferable to treat the attenuation data somewhat differently. Thus, it may be preferable to measure the amplitude of a given portion of the logarithmically amplified signals, e.g. the peak amplitude of a selected half cycle of each; and then after converting these amplitude measurements to time by comparing the voltage to a sawtooth signal, the time pulses may be transmitted up hole and the time difference in amplitude or the attenuation in terms of decibels thereof, as indicated above.

While a particular embodiment of the invention has been described above in considerable detail in accordance with the applicable statutes this is not to be taken as in any way limiting the invention but merely as being descriptive thereof.

What is claimed as the invention is:

1. In an acoustic logging system for use in a borehole; the combination comprising means for developing a first electrical signal in response to acoustic energy in the borehole, said electrical signal having a series of alternations; means for developing a second electrical signal in response to acoustic energy at a location in the borehole spaced longitudinally from said first electrical signal means, said second electrical signal having a series of alternations; means for producing a logarithmic function of each of said first and second electrical signals; gating means for passing only a predetermined first part of said logarithmic function of each of said first and second electrical signals; means for rectifying and integrating each of said predetermined first parts of said logarithmic function of said first and second electrical signals; and means for taking a difference between said rectified and integrated signals to provide an output which may be calibrated in terms of decibels of attenuation between the locations of said first and second named means.

2. In an acoustic logging system for use in a borehole; the combination comprising means for developing a first electrical signal in response to acoustic energy in the borehole, said electrical signal having a series of alternations; means for developing a second electrical signal in response to acoustic energy at a location in the borehole spaced longitudinally from said first electrical signal means, said second electrical signal having a series of alternations; means for logarithmically amplifying each of said first and second electrical signals; means for delaying each of said logarithmically amplified signals; gating means for passing only a predetermined first part of each of said logarithmically amplified signals; means for rectifying and integrating each of said predetermined first parts of said logarithmically amplified signals; and means for taking a difference between said rectified and integrated signals in order to provide an output in a form which may be calibrated in terms of decibels of attenuation between the locations of said first and second named means.

3. In an acoustic logging system for use in a borehole; the combination comprising first acoustic transducer means for developing a first electrical signal in response to acoustic energy in the borehole, said electrical signal having a series of alternations; second acoustic transducer means for developing a second electrical signal in response to acoustic energy in the borehole at a location spaced longitudinally from said first transducer means, said second electrical signal having a series of alternations; means electrically connected to each of said first and second transducer means for logarithmically amplifying each of said electrical signals; electronic gating means connected to each of said logarithmic amplifying means, both said gating means having operating time such that only a predetermined first portion of each said logarithmically amplified first and second electrical signals is permitted to pass; means connected to each of said gating means for rectifying and integrating each of said gate passed portions of said logarithmically amplified first and second signals; and means for taking a difference between said rectified and integrated signals in order to provide an output which may be calibrated in terms of decibels of attenuation between the locations of said first and second named means.

4. In an acoustic logging system for use in a borehole; the combination comprising first acoustic transducer means for developing a first electrical signal in response to acoustic energy in the borehole, said electrical signal having a series of alternations; second acoustic transducer means for developing a second electrical signal in response to acoustic energy in the borehole at a location spaced longitudinally from said first transducer means, said second electrical signal having a series of alternations; means electrically connected to each of said first and second transducer means for logarithmically amplifying each of said electrical signals; electronic gating means connected to each of said logarithmic amplifying means; both said gating means having a time of operation such that only a predetermined portion of said logarithmically amplified first and second electrical signals is permitted to pass; means connected to each of said gating means for rectifying and integrating each of said gated portions of said logarithmically amplified first and second signals; said rectified and integrated signals being proportional to the logarithm of said respective first and second signal amplitudes; electronic circuit means connected to receive said rectified and integrated signals and including means for producing a difference signal proportional to the difference between said rectified and integrated sginals.

5. The invention according to claim 4 further including recording means connected to said difference signal to provide a record which represents the logarithm of the ratio of said first and second signals and which may be calibrated in terms of decibels.

6. In an acoustic logging system for use in a borehole; the combination comprising means for developing a first electrical signal in response to acoustic energy in the borehole, said electrical signal having a series of alternations; means for developing a second electrical signal in response to acoustic energy at a location in the borehole spaced longitudinally from said first electrical signal means, said second electrical signal having a series of alternations; circuit means connected to receive each of said first and second electrical signals and including two branches one for each of said electrical signals; each of said branches comprising circuit means for producing a logarithmic function of the said signal therein, means for connecting said produced function to a gate, parallel circuit means for controlling said gate from the said signal in said branch, and means connected to the output of said gate to rectify the signal passing therethrough; and additional circuit means connected to both said branches to receive said rectified gate outputs for taking a difference therebetween.

7. In an acoustic logging system for use in a borehole; the combination comprising means for developing a first electrical signal in response to acoustic energy in the borehole, said electrical signal having a series of alternations; means for developing a second electrical signal in response to acoustic energy at a location in the borehole spaced longitudinally from said first electrical signal means, said second electrical signal having a series of alternations; means for producing a further first and second signal whose amplitude is a logarithmic function of the amplitude of said respective first and second electrical signals; gating means for passing a corresponding portion of each of said further first and second signals, and difference measuring means for measuring the amplitude difference of said gated portions of said further first and second signals, said difference signal being indicative of attenuation in decibels.

8. The combination according to claim 7 further including means for simultaneously making a velocity log from the said electrical signals.

9. The combination according to claim 1 further including means for simultaneously making a velocity log from said electrical signals.

10. The combination according to claim 3 further including means for simultaneously making a velocity log from said electrical signals.

11. The invention according to claim 6 further including means for simultaneously making a velocity log from said electrical signals.

12. The combination according to claim 7, wherein said gating means passes only a predetermined first part of each of said first and second electrical signals.

13. The combination according to claim 12 further including means for simultaneously making a velocity log from the said electrical signals.

References Cited by the Examiner

UNITED STATES PATENTS

| | | | |
|---|---|---|---|
| 3,011,582 | 12/1961 | Peterson | 181—.5 |
| 3,102,251 | 8/1963 | Blizard | 340—18 |

BENJAMIN A. BORCHELT, *Primary Examiner.*

R. M. SKOLNIK, *Assistant Examiner.*